Patented Jan. 10, 1950

2,493,948

UNITED STATES PATENT OFFICE 2,493,948

COPOLYMERS OF DIALLYL FUMARATE AND STYRENE

Richard E. Davies, Plainfield, and Amos Raymond Esterly, Metuchen, N. J., assignors to Catalin Corporation of America, a corporation of Delaware No Drawing. Application July 27, 1944, Serial No. 546,922

2 Claims. (Cl. 260—78.5)

This invention relates to copolymers of diallyl fumarate and styrene and the method of making.

The composition and method of the invention are particularly useful in making thermosetting cast plastic compositions that are glass clear, uniform, non-crazing, and hard. The invention will be illustrated, therefore, by detailed description in connection with the making of such cast and cured plastic material.

In an early stage of the development of polymers derived from allyl type esters of dibasic unsaturated acids, it was postulated that these esters would copolymerize with other unsaturated polymerizable compounds such as vinyl esters, acrylic and methacrylic esters, butadiene, styrene, etc. Later development has shown that, in the case of copolymerization of styrene with minor proportions of allyl type esters (such as diallyl-maleate, fumarate, oxalate, etc.), products are obtained which have become known as "popcorn" polymers. These products are characterized by their opaque, white appearance and friable, porous structure, and are reported to be useful as molding powders.

Contrary to the general opinion held in the literature that various allyl type esters are equivalents in their copolymerization with other polymerizable compounds, we have found that this is not the case, particularly when it is desired to produce a homogeneous, water-white casting of usable hardness and good machining characteristics by the copolymerization of allyl esters with styrene. Such castings can be obtained only by copolymerizing styrene with diallyl fumarate and then only in case the fumarate constitutes 17% to 80% of the weight of the copolymer and the copolymerization is carried out in the presence of a peroxide polymerization catalyst at temperatures varying from 50–110° C. Copolymerization of styrene with diallyl maleate for example, even if the latter is used in proportions much higher than those which produce "popcorn" type polymers, and no matter what other conditions exist, always leads to castings the hardness of which lies far below the usable limits.

Briefly stated, the invention comprises the method of and the composition resulting from copolymerizing diallyl fumarate with styrene in the proportion of 17 to 80 parts of diallyl fumarate for 100 parts total weight of fumarate and styrene and in contact with an accelerator of copolymerization of double bond monomers of which benzoyl peroxide is an example. In the preferred embodiment the invention comprises forming a mixture of the fumarate, styrene, and accelerator in the selected proportions, prepolymerizing the mixture to cause shrinkage and thus decrease shrinkage in the final curing, and then shaping and curing the mass until a hard cured product is obtained, the curing being effected preferably in a polystage operation so as to produce a hard, non-blushing polymer.

The method in somewhat greater detail includes mixing 17 to 80 parts of diallyl fumarate with styrene in amount to make 100 parts and with the copolymerization accelerator. The mixing is effected in any suitable equipment as, for instance, in a tank with power driven agitator.

Solution of the accelerator in the stirred liquid mass occurs rapidly. Warming is not necessary at this stage although warming may be used to increase the rate of solution.

After the catalyst is dissolved, to form a mixture of the fumarate, styrene, and catalyst, the composition is heated. Preferably it is first heated for a short time to cause prepolymerization and attendant shrinkage of the mass. Thus, the mass is prepolymerized, for instance, at a temperature of about 80° C. for 2 to 2½ hours, until the mass reaches the recognized consistency for casting. At this stage the mass appears stringy when touched with a glass rod and the rod withdrawn. This condition may also be determined by viscosity measurement showing the onset of substantial thickening. In general, the prepolymerization may be carried to a point just short of gelation. The greater the extent of the prepolymerization, the less total shrinkage there will be in the final curing process.

The prepolymerized material is then poured into molds. Here it is cured first at moderately elevated and then at somewhat higher temperature, as, for example, at a temperature of about 60° C. for 24 hours or so after which the temperature is raised to about 80° C. and held at that point for a period of time that may be 2 to 4 days. Towards the end of the curing process, however, the temperature may be raised to 90 to 110°, the exact temperature chosen depending upon the ultimate hardness desired in the product, and this higher temperature maintained for a day or two.

Proceeding in this manner there is obtained a cured plastic having the desirable combination of properties described above. Also the product so made has a surface that is not tacky, even though free access of air has been permitted during curing. The products seem to be thermoelastic rather than thermoplastic, that is, they are shape retaining at elevated temperatures. As the proportion of diallyl fumarate within the range 17 to 80% is increased, the products tend to become thermosetting and more brittle, with a higher heat distortion point. Although the copolymerization is attended by considerable shrinkage, the prepolymerized and then cast and cured products are free from shrinkage bubbles, splitting, and cracking, the avoidance of which is an important problem in the making of this type of cast cured plastics in large sizes.

In distinction from the clear, desirable material made as described, the addition of diallyl fumarate to styrene that has been polymerized for one hour at 80° C. previous to the addition of the diallyl fumarate produces an opaque product, showing insolubility of material remaining after the curing of the mixture. This distinction constitutes one of the proofs that copolymerization occurs when the diallyl fumarate and styrene are mixed when each is in the monomer form and then cured jointly.

Although a wide range of proportions of the fumarate to the styrene may be used, this range has definite limits that are critical.

The proportion of the diallyl fumarate should be between 17 and 80 parts for 100 parts of total weight of fumarate and styrene. With proportions of fumarate between about 2.5 to 17, "popcorn" or other undesirable effects are obtained in the finished plastic, the proportion of the undissolved suspended grains being particularly large near the middle of this range. Below 2.5 parts, the proportion of diallyl fumarate is not adequate to give casting properties to styrene, the product after curing showing shrinkage bubbles. Above about 80 parts of diallyl fumarate to 100 of fumarate and styrene, cracking and splitting are again encountered in the cured copolymer.

As the accelerator used there is employed one of those commonly understood to accelerate copolymerization of double bond monomers. Thus there may be used to advantage organic peroxides that in the proportions used are soluble in the mixed monomers and also in the copolymer. Of these peroxides the one that is most readily available and that is entirely satisfactory is benzoyl peroxide. It is, therefore, the catalyst that is preferably used by us in all copolymerizations described herein.

The accelerator is used in a catalytic proportion that is obviously small. There is never any need of going above 1% on the combined weight of the monomers used. Ordinarily amounts in excess of 0.5% represent an unnecessary expense and in addition introduce the danger of too violent and uncontrollable reaction. Ordinarily we use amounts within the range 0.05% to 0.3% and preferably about 0.1% of the peroxide.

In selecting the proportions and conditions within the range stated, it is to be noted that the larger the proportion of fumarate or the higher the temperature of curing for any given composition, the less the proportion of benzoyl peroxide that should be used. Thus, with a composition containing 80 parts fumarate and 20 of styrene, 0.05 part of peroxide is used to advantage for curing at 78° C. or 0.1 part for curing at 60° C. With a mixture of 20 parts fumarate to 80 of styrene, to be cured at 78° C., 0.2 to 0.3 part of the peroxide are preferred.

The prepolymerization which has been referred to is conducted for a short period of time only. During this period the material is flowable and is in constant agitation so that non-uniformity of product is prevented. For that reason the temperature may be slightly higher than used in the next stage of the processing. Thus, prepolymerization may be effected at a temperature of about 60° to 110° C. and suitably within the range 75° to 85° C. Times required for the prepolymerization are ordinarily 1½ to 2½ hours. Within the ranges given the times are shorter the higher the temperature used for the prepolymerization.

In any case the prepolymerization is continued until shrinkage is caused in the material and until the proper stage is reached for casting, as judged for instance by testing for stringiness as described above.

The prepolymerized and thus preshrunk material is then shaped as by casting into molds. The product is then cured to hard condition. The prepolymerization may be omitted when there is no objection to the results of large shrinkage in final curing. Prepolymerization is ordinarily not required in making small samples.

In any case curing is effected at some point above 40° C. and below the temperature of violent reaction of the monomers, as for examples between 80° and 100° to 110° and ordinarily between 60° and 90°. For commercial operations the temperature range of 60° to 80° is most satisfactory, with an additional final period of heating at about 110° C. Polystage curing is particularly important in decreasing crazing of large castings and giving in a reasonable time a hard non-blushed product. For these reasons an advantageous curing schedule is about as follows: 20 to 30 hours at about 60° C. (say 50 to 65°), 40 to 80 hours at about 80 C. (say 75° to 90°), and 20 to 60 hours at about 110° C. (say 100° to 115°), the total curing time being 100 to 150 hours.

The time period required for final curing is ordinarily about 2 to 6 days, the curing time for a given hardness desired being shorter the higher the temperature of curing within the ranges described above.

The invention will be further illustrated by description in connection with the following specific examples of the practice of it.

*Example 1*

There was formed a solution including 8 parts by weight of diallyl fumarate, 2 parts of styrene, and 0.01 part of benzoyl peroxide. This mixture was cured at 78° C. for 135 hours.

The product was a water-white, transparent resin of hardness +52 on the Rockwell H scale.

*Example 2*

Seven parts of diallyl fumarate, 3 parts of styrene and 0.1 part of benzoyl peroxide were mixed and warmed gently until a homogeneous solution was obtained. The product was then treated as described under Example 1.

The result was a water-white, transparent resin of hardness −27 on the Rockwell H scale.

*Example 3*

In the same manner there was made a product from 3 parts of diallyl fumarate, 7 parts of styrene, and 0.01 part of benzoyl peroxide.

Again the product was water-white and transparent. The hardness on the Rockwell H scale was −3.

*Example 4*

Making and copolymerizing as described a mixture of 85.4 parts of styrene, 14.6 parts of diallyl fumarate, and 0.1 part of benzoyl peroxide gave a cured product containing opaque suspended particles ("popcorn").

Example 5

97.5 parts of styrene, 2.5 parts diallyl fumarate, and 0.1 part of benzoyl peroxide were mixed and cured as described above, giving a product containing shrinkage bubbles.

Examples 4 and 5 illustrate conditions that are unsatisfactory for the present invention. With the very low percentage of diallyl fumarate in Example 5, namely, 2.5%, shrinkage bubbles were obtained in the cast and cured product. With the larger proportion that is still below the critical minimum for the making of a good plastic of diallyl fumarate and styrene, namely, the 14.6% of diallyl fumarate shown in Example 4, there was obtained the unsatisfactory "popcorn" product.

It will be understood that it is intended to cover all changes and modifications of the examples of the invention herein chosen for the purpose of illustration which do not constitute departures from the spirit and scope of the invention.

What we claim is:

1. The method of making a copolymer of diallyl fumarate and styrene which comprises forming a mixture consisting of diallyl fumarate, styrene and an organic peroxide serving as an accelerator of copolymerization, the proportion of the fumarate being 17 to 80 parts by weight for 100 parts of the combined weight of fumarate and styrene, warming the mixture to a temperature of at least approximately 60° C. until copolymerization is carried to the point of substantial shrinkage and thickening of the original liquid mixture and just short of gelation, so as to produce a preshrunk liquid product of consistency suitable for casting, and then pouring the thus preshrunk material into a mold and polymerizing the poured material at a temperature of approximately 60° C. to 110° C. to form a solid at room temperature.

2. The method described in claim 1, the organic peroxide serving as the accelerator being benzoyl peroxide and the proportion of it being 0.05 to 1% of the combined weight of the diallyl fumarate and styrene.

RICHARD E. DAVIES.
AMOS RAYMOND ESTERLY.

REFERENCES CITED

The following references are of record in the file of this patent:

UNITED STATES PATENTS

| Number | Name | Date |
|---|---|---|
| 2,273,891 | Pollack et al. | Feb. 24, 1942 |
| 2,311,615 | Zemba et al. | Feb. 16, 1943 |
| 2,318,959 | Muskat et al. | May 11, 1943 |
| 2,331,263 | Britton et al. | Oct. 5, 1943 |
| 2,340,110 | D'Alelio | Jan. 15, 1944 |
| 2,408,690 | Seymour | Oct. 1, 1946 |